(12) United States Patent
Hassan-Ali (10) Patent No.: US 12,475,416 B2
(45) Date of Patent: Nov. 18, 2025

(54) SELF-DISCOVERY OF PV ARRAY INSTALLATION MAPPING USING WIRELESS COMMUNICATION METHODS

(71) Applicant: HANWHA SOLUTIONS CORPORATION, Seoul (KR)

(72) Inventor: Mudhafar Hassan-Ali, Menlo Park, CA (US)

(73) Assignee: Hanwha Solutions Corporation, Seoul (KR)

( * ) Notice: Subject to any disclaimer, the term of this patent is extended or adjusted under 35 U.S.C. 154(b) by 149 days.

(21) Appl. No.: 18/475,063

(22) Filed: Sep. 26, 2023

(65) Prior Publication Data

US 2025/0103983 A1 Mar. 27, 2025

(51) Int. Cl.
*H02J 3/40* (2006.01)
*G06Q 10/0631* (2023.01)
(Continued)

(52) U.S. Cl.
CPC ........ *G06Q 10/06313* (2013.01); *H02J 3/381* (2013.01); *H02J 3/40* (2013.01);
(Continued)

(58) Field of Classification Search
CPC ...... G06Q 10/06313; H02J 3/381; H02J 3/40; H02J 3/46; H02J 2300/22; H02J 2300/24; H02J 2300/26; H02S 50/00; H02S 50/10
See application file for complete search history.

(56) References Cited

U.S. PATENT DOCUMENTS 9,502,902 B2 11/2016 Mumtaz
2008/0306700 A1* 12/2008 Kawam ................ H10F 77/955
702/182

(Continued)

FOREIGN PATENT DOCUMENTS

EP 4080378 A1 10/2022
KR 20180016856 A 2/2018
WO 2014/001756 A2 1/2014

OTHER PUBLICATIONS

International Search Report issued Dec. 20, 2024 in International Application No. PCT/KR2024/013923.

*Primary Examiner* — Levi Gannon
(74) *Attorney, Agent, or Firm* — Harness, Dickey & Pierce, P.L.C.

(57) ABSTRACT

A photovoltaic (PV) generator configured to enable a gateway computer to generate a network map. The PV generator including at least one PV module including a plurality of PV cells; a wireless communication interface; a powerline coupling configured to connect to a power line; and a module level power electronic (MLPE), the MLPE including processing circuitry and memory storing computer readable instructions that, when executed by the processing circuitry, cause the MLPE to determine times of arrival (ToAs) between the MLPE and neighboring MLPEs included in neighboring PV generators, generate an adjacency list, the adjacency list including a list of the neighboring MLPEs and data corresponding to the ToAs for each of the listed neighboring MLPEs, and transmit the adjacency list to a gateway computer, enabling the gateway computer to generate a network map based on the adjacency list.

19 Claims, 7 Drawing Sheets

(51) Int. Cl.
*H02J 3/38* (2006.01)
*H02J 3/46* (2006.01)
*H02S 50/10* (2014.01)

(52) U.S. Cl.
CPC ............ *H02J 3/46* (2013.01); *H02S 50/10* (2014.12); *H02J 2300/24* (2020.01)

(56) References Cited

U.S. PATENT DOCUMENTS

| | | |
|---|---|---|
| 2012/0133208 A1 | 5/2012 | Kalhoff et al. |
| 2017/0255803 A1 | 9/2017 | Yoscovich et al. |
| 2018/0041040 A1* | 2/2018 | Jung ................. H02S 40/32 |
| 2020/0373761 A1 | 11/2020 | Zhu et al. |
| 2021/0111672 A1 | 4/2021 | Rodriguez et al. |
| 2022/0069586 A1 | 3/2022 | Yu et al. |

* cited by examiner

SELF-DISCOVERY OF PV ARRAY INSTALLATION MAPPING USING WIRELESS COMMUNICATION METHODS

TECHNICAL FIELD

Various example embodiments relate to a PV (photovoltaic) module comprising MLPE (Module level power electronics) for measuring a distance between adjacent modules, a system including the PV module, a method for self-mapping a photovoltaic module using the same, and/or a non-transitory computer readable medium including computer readable instructions for performing the method.

BACKGROUND

During the commissioning of new PV generator arrays and/or modification of existing arrays PV module location mapping (e.g., array layout) is performed. The mapping (modules layout) is important for managing the individual PV module as a power generating source and as an asset that needs to be tracked periodically. Typically, the mapping is performed manually with some means related to assigning unique IDs (labeled with a QR (quick-response) code) to each PV module and manually monitoring the distances between identified PV modules. Therefore, a method of automatically determining the location and adjacency of the individual PV modules would reduce installation, maintenance, and asset-tracking times and costs.

SUMMARY

Example Embodiments

According to an example embodiment, a photovoltaic (PV) generator may include at least one PV module including a plurality of PV cells; a wireless communication interface; a powerline coupling configured to connect to a power line; and a module level power electronic (MLPE), the MLPE including processing circuitry and memory storing computer readable instructions that, when executed by the processing circuitry, cause the MLPE to determine times of arrival (ToAs) between the MLPE and neighboring MLPEs included in neighboring PV generators, generate an adjacency list, the adjacency list including a list of the neighboring MLPEs and data corresponding to the ToAs for each of the listed neighboring MLPEs, and transmit the adjacency list to a gateway computer, enabling the gateway computer to generate a network map based on the adjacency list.

According to an example embodiment, a network of photovoltaic (PV) generators may include an array of the PV generators; and a gateway computer, wherein, each of the PV generators includes a PV module, a wireless communication interface, a powerline coupling connected to a power line, and a module level power electronic (MLPE), the MLPE including processing circuitry and memory storing computer readable instructions that, when executed by the processing circuitry, cause the MLPE to determine times of arrival (ToAs) between the MLPE and neighboring MLPEs included in neighboring PV generators, generate an adjacency list, the adjacency list including a list of the neighboring MLPEs and data corresponding to the ToAs for each of the listed neighboring MLPEs, and transmit the adjacency list to the gateway computer, and wherein the gateway computer is configured to receive the adjacency list and to generate a network map based on the adjacency list.

According to an example embodiment, gateway computer may include processing circuitry; and memory storing computer readable instructions that, when executed by the processing circuitry, cause the gateway computer to receive a plurality of adjacency lists from a plurality of photovoltaic (PV) generators, each of the adjacency lists including a list of neighboring PV generators detected by a respective PV generator and data corresponding to Time of Arrivals (ToAs) for each of the listed neighboring PV generators detected by the respective PV generator, and generate a network map based on the plurality of adjacency lists, the network map indicating distances and directions between each of the plurality of PV generators.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of this disclosure.

DETAILED DESCRIPTION

Various example embodiments will now be described more fully with reference to the accompanying drawings in which some example embodiments are shown, wherein numbers refer to like elements throughout the description of the figures.

Detailed illustrative example embodiments are disclosed herein. However, specific structural and functional details disclosed herein are merely representative for purposes of describing example embodiments. The example embodiments may, however, be embodied in many alternate forms and should not be construed as limited to only the example embodiments set forth herein.

Accordingly, while example embodiments are capable of various modifications and alternative forms, the embodiments are shown by way of example in the drawings and will be described herein in detail. Therefore, it should be understood that there is no intent to limit example embodiments to the particular forms disclosed. On the contrary, example embodiments are to cover all modifications, equivalents, and alternatives falling within the scope of this disclosure.

It will be appreciated that a number of example embodiments described herein may be used in combination.

As discussed herein, the terminology "one or more" and "at least one" may be used interchangeably.

Figure 1:
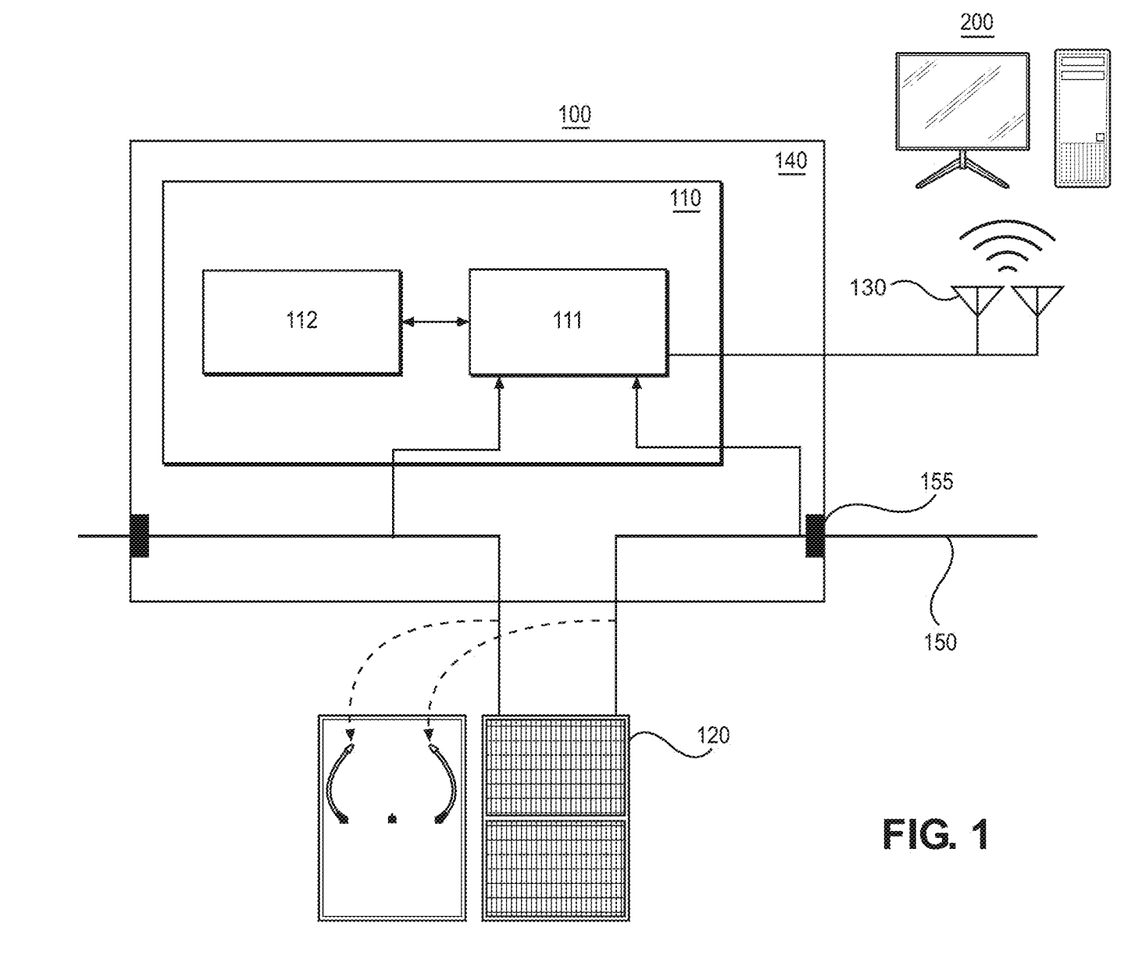
FIG. 1 illustrates an example of a photovoltaic (PV) generator according to at least one example embodiment.

FIG. 1 illustrates an example of a photovoltaic (PV) generator 100. The PV generator 100 may include a Module Level Power Electronics (MLPE) 110, at least one PV module 120, a communication interface 130, and power line couplings 155, etc. The PV generator 100 may be configured to communicate with an external device 200, such as the gateway computer discussed below in further detail.

According to at least one example embodiment, the PV module 120 may include a plurality of PV cells sealed in, e.g., an environmentally protective laminate and/or a protective transparent material, etc. In the PV module, the PV cells may be connected in parallel and/or in series. The PV module 120 may further include at least a pair of conductive contacts, with one of the contacts configured to operate as an output for the power generated by the PV cells and the other contact configured to operate as an input to complete the circuit. The PV cells are configured to produce power (e.g., energy, current, etc.) in response to stimulation from radiation (e.g., solar radiation, etc.). For example, in at least one example, the PV cells are configured to operate as electron pumps in response to stimulation from photons. In at least one example embodiment, each of the PV cells may comprise at least one of a photovoltaic crystalline, polycrystalline, amorphous, and/or thin film semiconductor structure, but are not limited thereto.

In at least one example embodiment, a plurality of the PV module 120 may be included in a PV panel (not illustrated), and a plurality of panels may be included in a PV array (not illustrated).

According to at least one example embodiment, the MLPE 110 is configured to perform maximum power point tracking (MPPT) at the PV module level. For example, in at least one example embodiment, the MLPE 110 may be configured to control and/or adjust the operational current and/or voltage combinations of the PV module 120 (and/or a plurality of the PV module 120 in an array) to maximize power output based on, e.g., changes to the power output by the PV module 120, etc. For example, the MLPE 110 may be configured to monitor the current produced by the PV module 120 and to adjust the voltage in response to a change in current due to, e.g., time of day, weather conditions, shading and/or contaminate (e.g., dirt, soil, water, smog, and/or the like), etc., on the PV module 120, deterioration and/or damage to the PV module 120, etc., but the example embodiments are not limited thereto. Though the example illustrated in FIG. 1 shows the MLPE 110 monitoring a single PV module 120, the examples are not limited thereto, and, for example, in at least some example embodiments, the MLPE 110 may be configured to monitor and manage each of a plurality of PV modules in, e.g., a PV panel, at least a section of a PV array, and/or the PV array, etc.

The MLPE 110 may include processing circuitry 111 and memory 112. The processing circuitry 111 may include hardware or hardware circuit including logic circuits; a hardware/software combination such as a processor executing software and/or firmware; or a combination thereof. For example, the processing circuitry more specifically may include (and/or be included in) a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The memory 112 may include computer-readable program code stored in a computer-readable medium. The computer-readable program code may be provided to a variety of computers or processors of other data processing devices. The computer readable media may be, for example, a non-transitory computer readable media. The term "non-transitory," as used herein, is a description of the medium itself (e.g., as tangible, and not a signal) as opposed to a limitation on data storage persistency (e.g., volatile memory vs. non-volatile memory, etc.). For example, the computer-readable recording medium may be any tangible medium that can store or include the program in or connected to an instruction execution system, equipment, or device, and may include a random access memory (RAM), a read only memory (ROM), and/or a non-volatile mass storage device, such as a disk drive, and/or a solid state drive, etc. The memory 112 may include, for example, computer readable instructions to be executed by the processing circuitry 111. In at least some example embodiments, such computer readable instructions may be loaded from a non-transitory computer-readable storage medium independent of the memory 230, using a drive mechanism (not illustrated). For example, the memory 112 may include various special purpose program code including the computer executable instructions which may cause the PV module 120 to perform the one or more of the methods of the example embodiments.

Additionally, the processing circuitry 111 is configured to execute processes by retrieving the program code (e.g., the computer readable instructions) and data from the memory 112 to process them, thereby executing special purpose control and functions of the entire PV module 120. Once the special purpose program instructions are loaded into the processing circuitry 111, the processing circuitry 111 executes the special purpose program instructions, thereby transforming the processing circuitry 111 into a special purpose processor.

In at least one example embodiment the processing circuitry 111 and the memory 112 may be included, e.g., as a printed circuit board assembly (PCBA), a system-on-chip, and/or the like.

In at least one example embodiment, the MLPE 110 may further include an MLPE enclosure 140 protecting the processing circuitry 111, the memory 112, etc.

The PV generator 100 further includes a communication interface 130. The communication interface 130 may be a wireless communication interface including one or more antenna. In at least one example embodiment, the communication interface 130 may further include a wired communication interface (e.g., an Ethernet connection, a power line communication (PLC) connection, etc.). For example, the communication interface 130 may be configured to establish a wireless connection and to wirelessly communicate with another wireless communication interface. For example, the communication interface 130 may be configured to establish a least one of a Bluetooth connection, a Wireless Fidelity (WiFi) connection, a wireless mesh network connection, a cellular network connection, an ultra-wide band (UWB) connection, and/or the like.

In at least one example embodiment, the communication interface 130 may be configured to communicate with a gateway computer (described in further detail below) and/or to a user's device (e.g., a smartphone, a computer, a monitoring device, etc.), e.g., through a direct connection and/or through a wireless network connection (e.g., the cellular network connection, the wireless mesh network, etc.). More specifically, in at least one example embodiment, a plurality of PV generators may be configured to establish a wireless network configure to connect the PV generators, and to connect the PV generators to an external device, such as the gateway computer, and/or a user's device.

The PV generator 100 further includes power line couplings 155 configured to be connected to a power line 150 and to transmit the power generated by the PV module 120 to the power line 150. In at least some example embodiments, the MLPE 110 may be configured to further communicate with neighboring MLPEs using, e.g., PLC. For brevity and clarity, the figure illustrates only one PV module 120 associated with the MLPE 110, however the example embodiments are not limited thereto. For example, the MLPE 110 may be configured to monitor and control the operations of one or more PV modules 120 and/or one or more PV panels.

Figure 2:
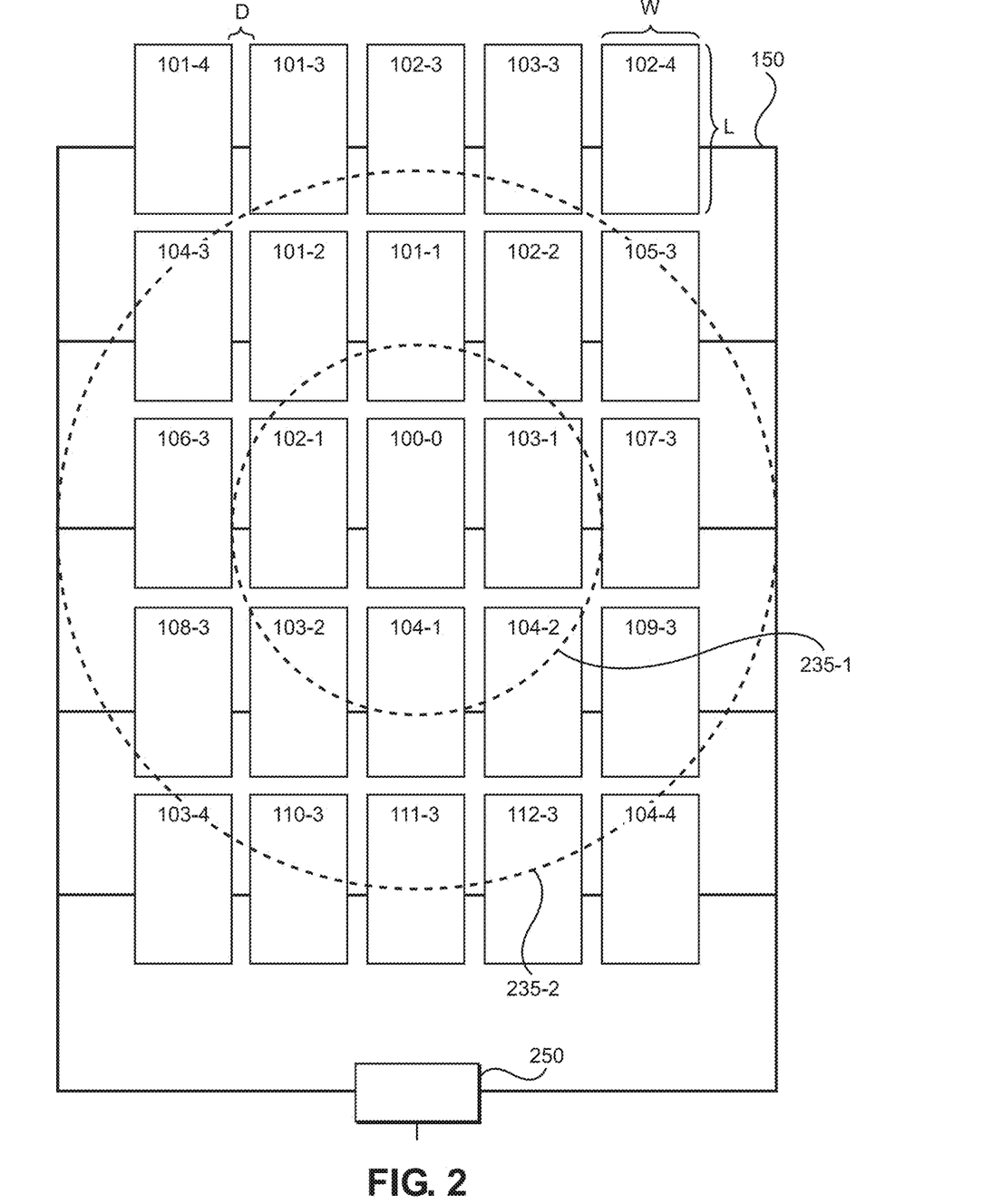
FIG. 2 illustrates an example of an array of PV generators according to at least one example embodiment.
Figure 3:
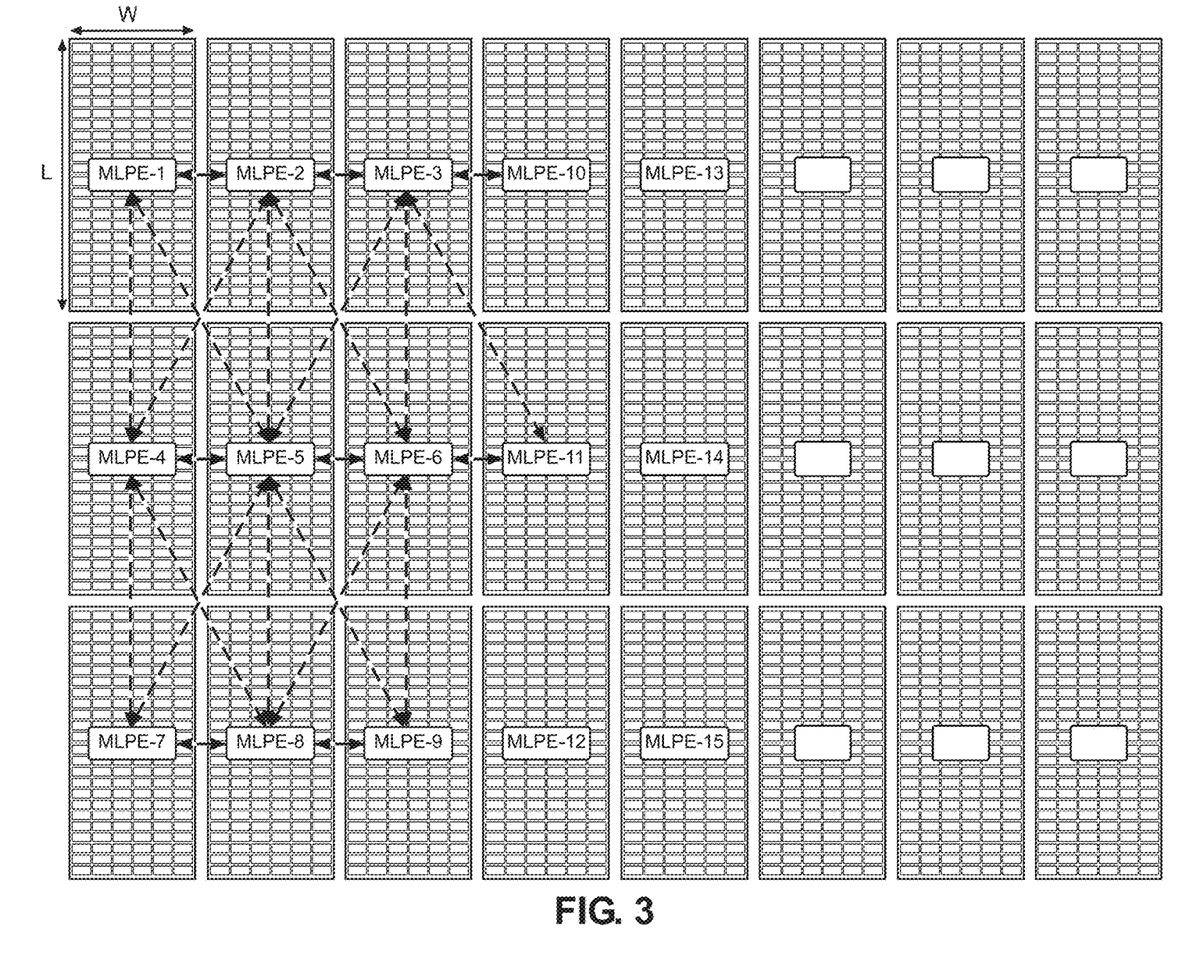
FIG. 3 illustrates a diagram for determining adjacency in an array of PV generators according to at least one example embodiment.

FIG. 2 illustrates an example of an array of PV generators 100-1 through 104-4; and FIG. 3 illustrates a diagram for determining adjacency in an array of PV generators. While FIGS. 2 and 3 illustrate an array of PV generators arranged in a two-dimensional grid for the sake of clarity, the example embodiments are not limited thereto, and for example, the arrangement of the array of PV generators may further include a third dimension (e.g., a vertical component).

According to at least one example embodiment, a PV generator (e.g., the PV generator 100 of FIG. 1) may be included in a plurality of PV generators 100-0, 101-1 through 101-4, 102-1 through 102-4, 103-1 through 103-112-3 and 101-4 through 104-4, but the example embodiments are not limited thereto. In at least one example embodiment, the plurality of PV generators 100-0 to 104-4 may be included in a grid configuration (e.g., including a plurality of columns and rows, as illustrated), and/or included in a honeycomb-like configuration (e.g., including a plurality of staggered rows or columns, not illustrated), but are not limited thereto. According to some example embodiments, the plurality of PV generators 100-0 to 104-4 may be arranged at a same vertical height and/or at different vertical heights. For example, the plurality of PV generators 100-0 to 104-4 may be on a flat surface, an incline, mound, and/or the like.

Each of the plurality of the PV generators may be adjacent to a number of first-order adjacent PV generators, wherein, the first-order adjacent PV generators represent the nearest neighboring PV generators to the referenced/selected PV generator. For example, a PV generator in the corner of the grid array (e.g., one of the PV generators 101-4 through 104-4) may include 2 (two) first-order adjacent PV generators, a PV generator in an edge of the grid array but not the corner (e.g., one of the PV generators 101-3 through 112-3) may include 3 (three) first-order adjacent PV generators, and a PV generator in the grid array but not in the corner or edge (e.g., PV generators 100-0 through 102-4) may include 4 (four) first-order adjacent PV generators. For example, using PV generator 100-0 as a reference, each of the PV generators in the grid array but not in the corner or edge includes a plurality of first-order adjacent PV generators 101-1 through 104-1. Alternatively, a PV generator in the corner of the honeycomb array may include 2 (two) first-order adjacent PV generators, a PV generator in an edge of the honeycomb array but not the corner may include 3 (three) to 5 (five) first-order adjacent PV generators, and an PV generator disposed in the grid array but not in the corner or edge may include 6 (six) first-order adjacent PV generators.

In the array of PV generators, a row (or column) of PV generators may be connected in series, but is not limited thereto. For example, in at least one example embodiment, each of the PV generator included in a row of the array of PV generators may be connected as a string or chain (e.g., in series) and each of the rows may be connected in parallel. The array may be further connected to a power load 250, such as a power grid, a battery, and/or the like.

In at least some example embodiments, each of the MLPE included in the PV generator may be configured to establish communication (e.g., a wireless communication) with each of the first-order adjacent MLPEs included in the first-order adjacent PV generator. For example, as described in further detail below, a MLPE included in the PV generator 100-0 may be configured to transmit a ping signal 235-1 with a first intensity, and/or a plurality of ping signals (e.g., 235-1 through 235-$n$) with increasing intensities. For clarity, the MLPEs are described as being at the center of the PV generators, but the examples are not limited thereto.

In at least one example embodiment, the MLPE may define a neighboring MLPE that responds to the first ping 235-1 as a first-order adjacent MLPE. For example, in some example embodiments, the intensity of the first ping 235-1 may be set to a level wherein a signal strength of the first ping 235-1 is at or above a threshold for the first-order adjacent MLPEs, and less than the threshold at distances past the first-order threshold.

The first ping 235-1 may be configured to accommodate the widths W and the lengths L of PV generators. For example, in a case wherein the PV generators are expected and/or designed to be spaced apart by a distance d, and the length L of the PV generator is between one to two times the width of the PV generator, the MLPE may set the intensity of the first ping 235-1 such that the level of the signal at a distance of d+0.5 L is equal to the first-order threshold. However, this is only an example, and the example embodiments are not limited thereto. For example, in at least one example embodiment, the intensity of the first ping 235-1 may set the intensity of the first ping 235-1 such that the level of the signal at a distance of d+L is equal to the first-order threshold, thereby including the first-order adjacent PV generators and a sub-set of the second-order adjacent PV generators.

For example, in these cases, as illustrated in FIG. 3, a corner MLPE (e.g., MLPE-1) is configured to establish a wireless connection with the orthogonal first-order adjacent MLPEs (e.g., MLPE-2 and MLPE-3) and the nearest diagonal second-order MLPEs (e.g., MLPE-4). Similarly, an MLPE at an edge of the grid array but not the corner (e.g., MLPE-3) is configured to establish a wireless connection with the orthogonal first-order adjacent MLPEs (e.g., MLPE-1, MLPE 4, and MLPE-9) with the nearest diagonal second-order MLPEs (e.g., MLPE-2, and MLPE 10); and an MLPE not at the edge or corner (e.g., MLPE-4) is configured to establish a wireless connection with the orthogonal first-order adjacent MLPEs (e.g., MLPE-2, MLPE-3, MLPE-7, and MLPE-10) and the nearest diagonal second-order MLPEs (e.g., MLPE-1, MLPE-5, MLPE-9, and MLPE-11).

The MLPE may further be configured to respond to pings, and may be configured to establish a wireless connection with an MLPE transmitting the ping and/or initiating the connection. For example, the MLPE may be configured to determine whether to respond to a ping based on the intensity of the ping, and/or based on the number of pings received. For example, in at least one embodiment, the MLPE may be configured to respond to a ping of a first intensity greater than or equal to the first-order threshold and/or to respond after receiving a desired number of pings at a second intensity greater than or equal to a second-order threshold, less than the first-order threshold. The transmission of higher-order pings is discussed in further detail in connection with FIG. 7.

Figure 4:
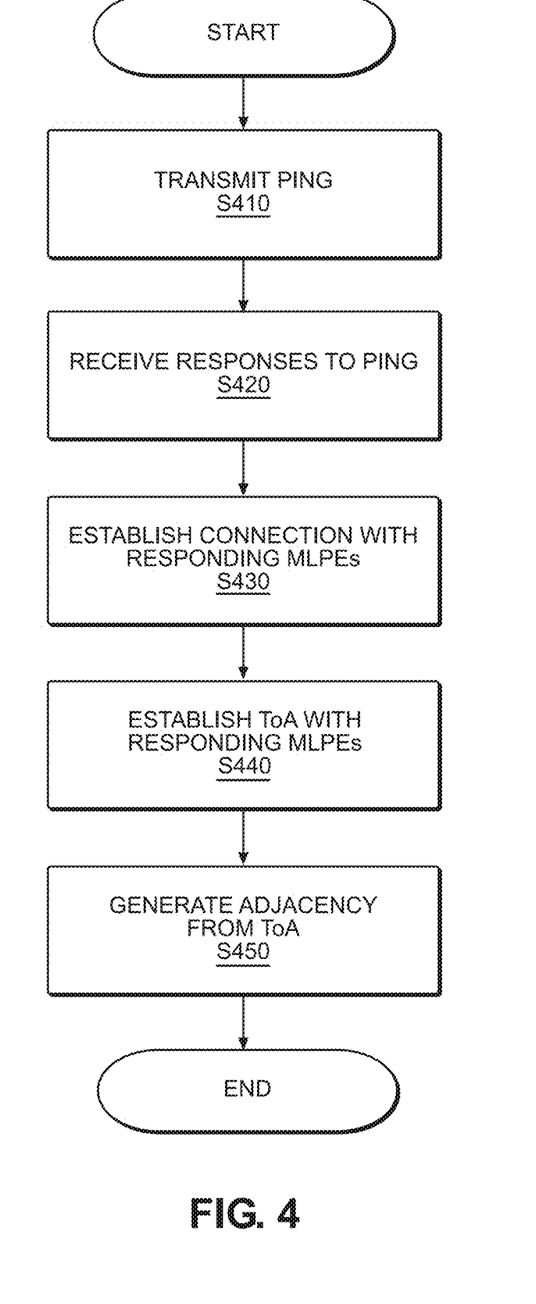
FIG. 4 is flowchart illustrating a method according to at least one example embodiment.
Figure 5:
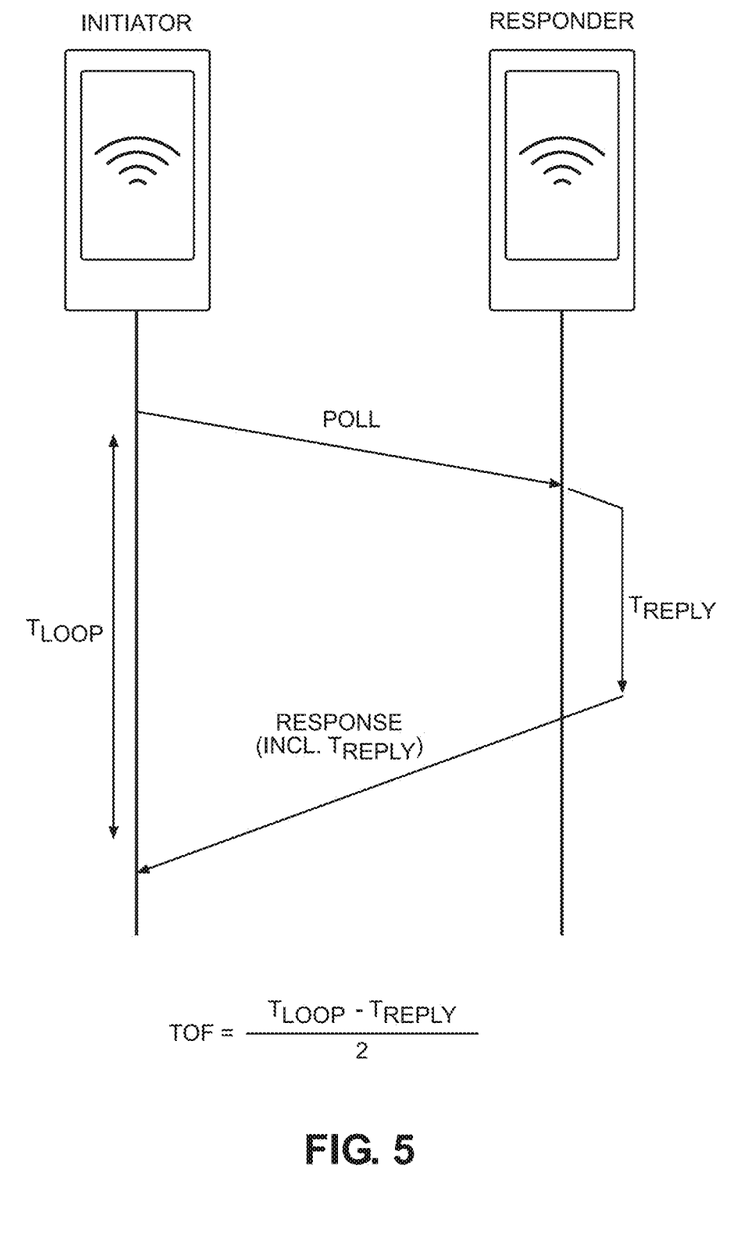
FIG. 5 illustrates a diagram for determining time of arrival (ToA) between an initiator and a responder according to at least one example embodiment.

FIG. 4 is a flowchart illustrating a method according to at least one example embodiment; and FIG. 5 illustrates a diagram for determining time of arrival (ToA) between an initiator MLPE and at least one responder MLPE. In at least some example embodiments, the method of FIG. 4 may be executed by, e.g., the processing circuitry 111 of FIG. 1, but is not limited thereto.

At operation S410, the MLPE is configured to transmit a first ping of a first intensity, and the first ping may include information such as an initiator identifier identifying the initiator transmitting the first ping, a transmission time corresponding to a time when the initiator transmitted the first ping, a ping identifier identifying that the ping is a first ping, etc. In at least one example embodiment, the intensity (e.g., transmission strength, etc.) of the ping may be set such that a neighboring MLPE receiving the MLPE is enabled to and/or caused to identify itself as a first-order neighbor in response to receiving the ping at the first intensity (or greater). In at least some example embodiments, the MLPE is also configured to respond to a received ping of the first intensity, or in other words, the responder will respond to a received first ping if the intensity (and/or transmission strength) of the received first ping is greater than or equal to a desired threshold intensity (e.g., associated with and/or corresponding to a desired distance). The MLPE responding to the ping may also be referred to as a responder (and/or the responder MLPE) and the MLPE which transmitted to the first ping may be referred to as an initiator (and/or the initiator MLPE). The responsive ping may include information, such as a responder identifier identifying the responder MLPE responding to the first ping, a transmission time corresponding to a time when the responder MLPE transmitted its response to the first ping, etc., but is not limited thereto. In at least one example embodiment, the MLPE may be configured to transmit the ping in response to a trigger, but is not limited thereto. For example, in some example embodiments, an initiation of the ping may be in response to at least one of an initiation signal from a gateway computer, a determination that the PV generator is in an installation mode, a determination that a change in power generated by the PV generator is greater than a first threshold value, a determination that a change in power received from at least one of the neighboring PV generators is greater than a second threshold value, any combinations thereof, and/or the like.

At operation S420, the initiator receives the response to the first ping from the responder. In some example embodiments, if the initiator does not receive a response to the first ping, the initiator is configured to periodically repeat the ping. For example, the initiator may be configured to transmit a ping based on a predetermined (or otherwise desired) interval. In at least some example embodiments, the initiator may be configured to adjust the period for transmitting the ping based on the operational mode of the initiator. For example, in some example embodiments, the initiator may be configured to transmit the ping based on a first interval while the initiator is in an installation mode and second interval (longer than the first) while the initiator is in a monitoring mode, but is not limited thereto. According to other example embodiments, the initiator may receive an instruction from, for example, the gateway computer, etc., to transmit the ping, etc.

At operation S430, the initiator establishes a connection, e.g., a wireless connection, etc., with the responder. In at least some example embodiments, the wireless connection may be a least one of a Bluetooth connection, a Wireless Fidelity (WiFi) connection, a wireless mesh network connection, a cellular network connection, an ultra-wide band (UWB) connection, and/or the like. In at least one example embodiment, the initiator and the responder(s) may use the wireless connection to establish a communication network (e.g., a mesh network) which enables the MLPEs to communicate with each other, a gateway computer, and/or other wirelessly enabled devices. For example, in some example embodiments, the MLPEs may use the communication network to transmit health reports for the PV generators, status reports, etc. In at least some example embodiments, establishing the connection may include establishing a frequency band and/or communication intensity between the initiator and responder, and/or establishing a communication protocol to mitigate interference between the initiator other potential responders.

At operation S440, the initiator establishes a time of arrival (ToA) and/or an Angle of Arrival (AoA). Herein, ToA may also be referred to Time of Flight (ToF).

In at least one example, the initiator transmits a polling message to at least one responder and receives a response message from the at least one responder identified in operation S420, but the example embodiments are not limited thereto. For example, the initiator may directly transmit the polling message to, and receive the response message from, a desired responder based on the established communication network between the initiator and the desired responder. As another example, the initiator may transmit and/or broadcast the polling message a plurality of desired responders over the established communication network and receive the plurality of response messages from the plurality of desired responders, etc. In at least one example embodiment, the initiator may be configured to stagger the transmission of the polling messages and/or the responder(s) may be configured to stagger responding to the polling message.

The response may include a time-to-reply indicator ($T_{reply}$ of FIG. 5), which indicates the period of time the responder took to reply to a received poll. In at least some example embodiments, the ToA may be determined to be half the difference between the time between the initiator transmitting the poll and receiving the response ($T_{loop}$) and the time to response ($T_{reply}$). In at least one example embodiment, the initiator may be configured to assume Line of Sight (LoS) conditions in determining the ToA, but the example embodiments are not limited thereto. For example, in these cases, the initiator may not compensate for obstructions and/or the curvature of the earth in order to simplify the computational requirements.

Additionally, the example embodiments are not limited thereto, and for example, the ToA may be determined based on the ping and the response to ping performed in operations S410 and S420, etc. For example, in at least one example embodiment, operation S440 may be integrated into operations S410 and/or S420, such that the initiator establishes the ToA based on the ping and response. For example, in at least some example embodiments, the ping of operation S410 may include the polling message and/or the response of S420 may include the time-to-reply indicator ($T_{reply}$ of FIG. 5).

Further, in at least one example embodiment, the polling message may include information, such as an initiator identifier identifying the initiator transmitting the polling message, a transmission time corresponding to a time when the initiator transmitted the polling message, a polling message identifier identifying that the message is a polling message, etc.

Additionally, in at least one example embodiment, the response message information, such as the responder identifier identifying the responder responding to polling message, the time-to-reply indicator, a receipt time corresponding to a time when the responder received the polling message, a transmission time corresponding to a time when the responder transmitted the response message, etc.

In at least one example embodiment, the MLPE may be configured to perform operation S440 in response to, e.g., an initiation signal from the gateway computer, a determination that a change in power generated by the PV generator is greater than a first threshold value, a determination that a change in power received from at least one of the neighboring PV generators is greater than a second threshold value, or any combinations thereof.

At operation S450, the initiator generates an adjacency list based on the ToA. For example, in some example embodiments, the initiator may use the ToA to determine the distance between the initiator and the responder and/or may transmit data including the ToA for each of the responder(s) to the gateway computer, thereby enabling the gateway computer to determine the distances between PV generators and/or generate a map of the PV generators, etc.

The adjacency list may include, e.g., a list of MLPEs that responded to the ping and the corresponding ToA for each of the listed MLPEs. In some example embodiments, the adjacency list may also identify whether the listed MLPE is identified as a first-order adjacent MLPE or a higher-order neighboring MLPE (e.g., a second-order neighboring MLPE, and/or the like). In some example embodiments, the adjacency list may include the distances between the initiator and the listed MLPEs.

In at least some example embodiments, the initiator may receive the response twice. For example, in cases wherein the initiator includes two or more antennas, the initiator may receive the response at a first antenna and a second antenna. In these cases, the initiator may determine the AoA based on a difference between the ToA for the first antenna and the ToA for the second antenna; and the adjacency list may further include the ToA for the two or more antennas and/or the corresponding AoA for each of the listed MLPE.

In at least some example embodiments, the MLPE is further configured to determine a distance between the initiators and responders directly connected to the initiator through a powerline. For example, the attenuation of a PLC signal transmitted through and/or received from the powerline may be compared to a predetermined (or otherwise determined) maximum, and the difference used to determine a length of the powerline. In at least some example embodiments, the length of the powerline can be used to confirm and/or calibrate the determined ToA. The MLPE may be configured to include the attenuation value (e.g., at least one of a result of the comparison and/or a distance determined based on the comparison) in the adjacency list as attenuation data.

In at least some example embodiments, the initiator may transmit the adjacency list to a gateway computer connected to the array of PV generators, thereby enabling the gateway computer to determine the distances between neighboring PV generators, generate a map of the PV generators, and/or to monitor the array of PV generators, etc.

According to some example embodiments, all of the MLPEs of the array of PV generators may act as initiators and may perform operations S410 to S450, etc., but the example embodiments are not limited thereto, and for example, a subset of the MLPEs of the array of PV generators may act as initiators. For example, according to at least one example embodiment, during a monitoring mode, only a subset of the MLPEs may be configured as an initiator and/or a gateway computer may select a next MLPE to act as an initiator and may transmit an initiation signal to the selected MLPE, etc., thereby reducing the energy consumption of the array of PV generators.

Though an example was described above, with relation to FIG. 4, the example embodiments are not limited to the specific order provided above.

Figure 6:
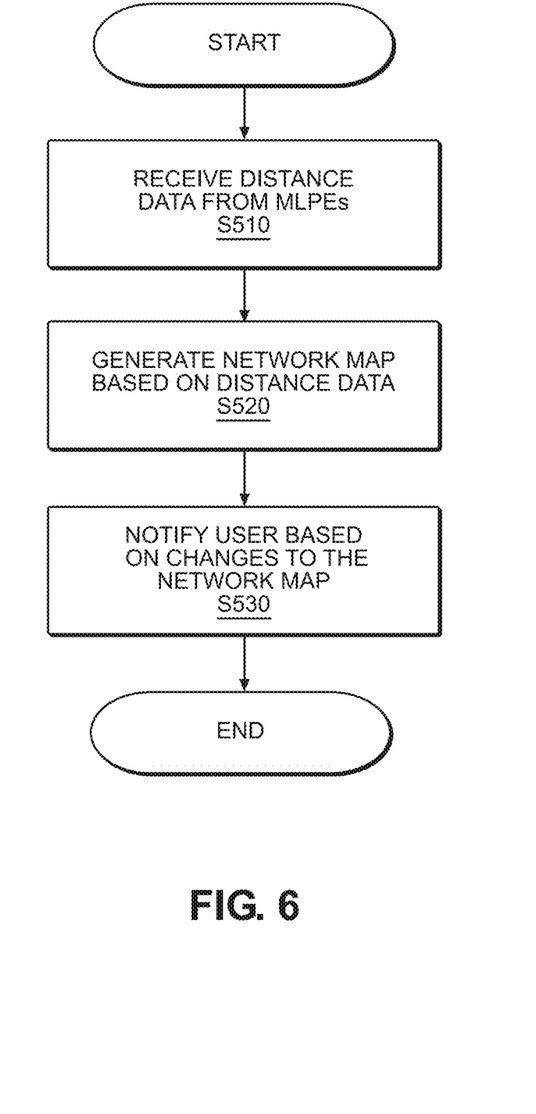
FIG. 6 is flowchart illustrating a method according to at least one example embodiment.

FIG. 6 is a flowchart illustrating a method according to at least one example embodiment. In at least some example embodiments, the method of FIG. 6 may be executed by a gateway computer (e.g., 200 of FIG. 1) connected to the array of PV generators of FIG. 2, but is not limited thereto. In at least some example embodiments, the gateway computer may be included in one of the PV generators of the array and/or as a separate computer including processing circuitry.

At operation S510, the gateway computer receives distance data from a plurality of MLPEs. For example, the distance data may include the plurality of adjacency lists generated by a plurality of MLPEs.

At operation S520, the gate computer generates a network map based on the distance data. In at least one example embodiment, generating a network map may include sorting the received information based on the identity of the initiator and/or the identities of the responders. For example, the sorting may include, for each adjacency list received from the plurality of MLPEs, sorting the data in ascending order. Then, the adjacent MLPEs for each MLPE may be determined and saved as a subset list.

For example, referring to FIGS. 3 and 6, wherein the subset of each MLPE may be presented by n (m1, m2, m3, m4), wherein n represents the initiator's identification (ID) and the m represents the first-order neighboring MLPEs, each of the numbered MLPEs in FIG. 3 may be represented by: 1(2,X,4,X), 2(1,3,5,X), 3(10,2,6,X), 10(13,3,11,X), 13(10,X,14,X), 4(X,X,7,1), 5(6,4,8,2), 6(11,5,3,9), 11(14,6,10,12), 14(11,X,15,13), 7(X,8,X,4), 8(9,7,X,5), 9(12,8,6,X), 12(9,15,11,X), 15(12,X,14,X). For brevity and clarity, the distance data is omitted from the above example subset list, but the examples are not limited thereto. In examples wherein the adjacency list further includes AoA data, the subset may further be listed based on orientation (or direction) relative to the initiator and/or include the AoA data. For example, the subset may be represented as n(E, W, S, N), wherein E, W, S, and N, represent east, west, south, and north with respect to the illustrated example.

In at least one example, one of the MLPEs in the subset list may be selected as a seed (or nucleation) for building the map, and the map may be grown from the seed.

For example, based on the above, the gateway computer may select MLPE-1 as the seed, and grow the map such that MLPE-2 and MLPE-4 are, respectively, to the left and south of MLPE. Then, the gateway computer may select at least one of MLPE-2 and/or MLPE-4 and grow the map such that MLPE-3 and MLPE-5 are, respectively, left, and south of MLPE-2 and/or MLPE-7 is south of MLPE-4. The map may be iteratively grown until each MLPE is included in the map. In at least some example embodiments, the map may be validated during the growth (e.g., at each iteration and/or after a preset number of iterations). For example, the gateway computer may reorient the map in cases wherein there is a conflict between the map and the subset list (for example, wherein the orientation of the map does not match the adjacencies of the subset list), may verify distances between MLPEs, may identify missing MLPEs, mispositioned or mal-positioned MLPEs, and/or may identify any other errors in the map and/or subset lists. Additionally, the gateway computer may be configured to compensate for differences between ToA data and/or for the LoS assumption.

In at least some example embodiments, the gateway computer is configured to update the map periodically. For example, in at least some example embodiments the gateway computer may receive health reports from the array of PV generators, and transmit an initiation signal in response to a determination that a change (e.g., a decrease) in power generated by the array of PV generator is greater than a threshold value, a disruption and/or disconnection of communication from neighboring MLPEs, etc. The initiation signal may include instructions for a MLPE included in the array of PV generators (e.g., the MLPE with the decreased power generation and/or a neighboring MLPE) to initiate a determination of the ToA between the selected MLPE and the neighboring MLPE. The gateway computer may receive an update from the selected MLPE and revise the map based on the received update.

As such, the gateway computer may be aware when a change in the PV generator array has occurred, for example, when a PV generator has been moved and/or removed from the array, a PV generator has been damaged, an obstruction has occurred, the powerline connection between PV generators has been damaged, etc.

At operation S530, the gateway computer may generate and transmit a notification to a user of a change to the array of PV generators. For example, while in an installation mode, the alert from gateway computer may inform the user of the MLPE's (and the corresponding PV generator) relative position and distance to neighboring MLPEs, thereby reducing the installation time and cost for installing a PV generator in the array. More specifically, since the gateway computer informs the user of the MLPEs' relative position and distance to neighboring MLPEs, the user is not required to implement the additional tools and/or time to determine the distances. Additionally, while in a monitoring mode, the user may be informed when an MLPE (and the corresponding PV generator) has been moved and/or removed from the array, has been damaged, etc. Therefore, the user may be informed of an abnormality indicating, e.g., potential theft without constant manual monitoring by, e.g., additional equipment and/or staff, thereby reducing the costs for asset tracking. For example, in at least one example embodiment, an alert may be generated and transmitted to the user when a change in the map is greater than or equal to a tolerance value. Additionally, in at least some example embodiments, the wireless communication network established by the MLPEs may be configured to establish a connection with the user's device, such that when the user's device connects to the wireless communication network established by the MLPEs, the gateway computer is enabled to determine the user's device position relative to the MLPEs in the network map such that the gateway computer and to update the relative position of the user's device. For example, in at least some example embodiments, e.g., in the case where an MLPE is identified as requiring maintenance and/or repair, the gateway computer may direct the user's device towards the identified MLPE, identify the location of the MLPE on a map of the PV generators, etc.

In at least some example embodiments, the alert may be provided to, e.g., a user's device (e.g., mobile device, computer, and/or the like) though an application ("App") running on the device. In at least one example embodiment, while in the monitoring mode, the alert may further initiate additional security devices. For example, in at least one example embodiment, the alert may induce a security camera and/or microphone to start recording and/or streaming a video and/or audio feed from the security camera and/or microphone to the user's device.

Figure 7:
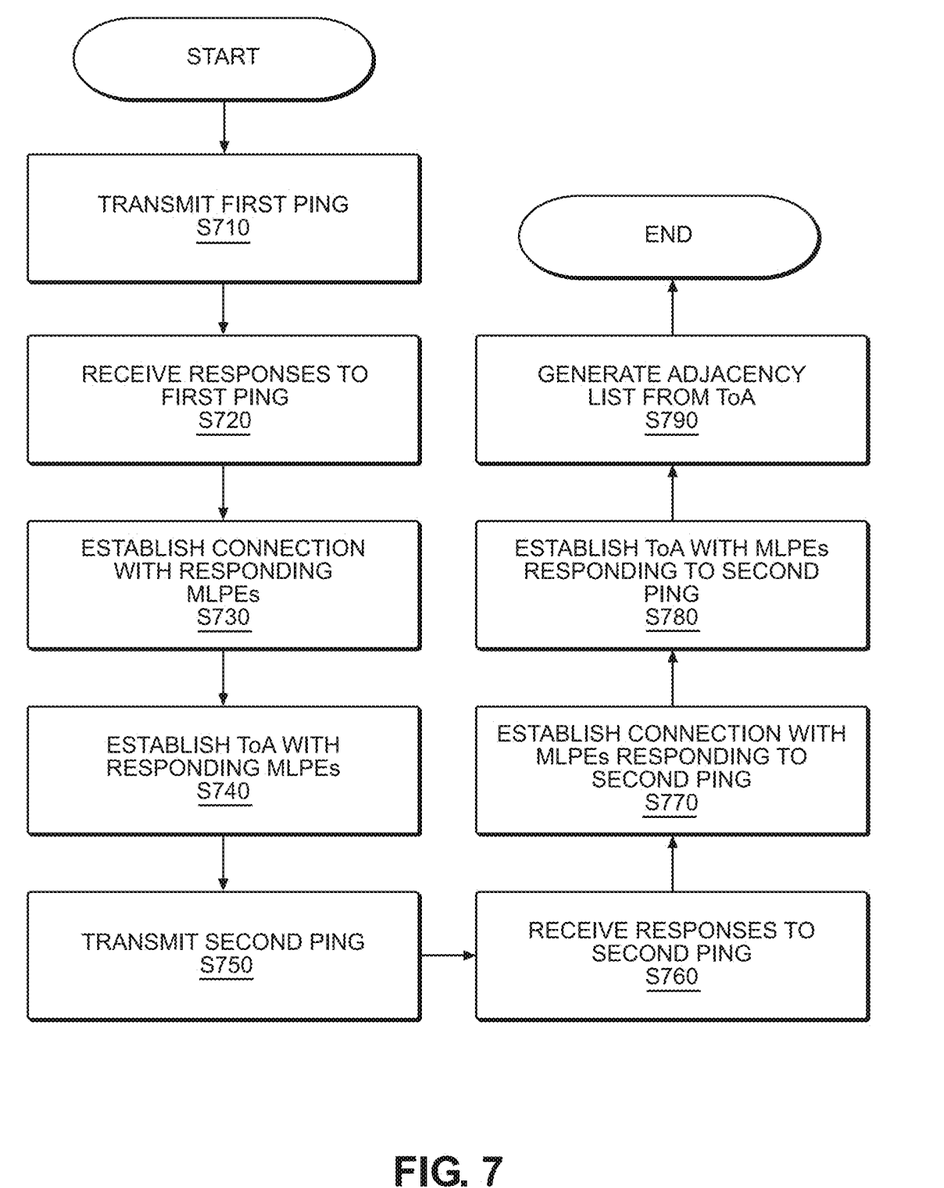
FIG. 7 is a flowchart illustrating a method according to at least one example embodiment.

FIG. 7 is a flowchart illustrating a method according to at least one example embodiment. In FIG. 7, operations S710, S720, S730, S740, and S790 may be, respectively, the same as or substantially similar to operations S410 through S450. Thus, for brevity, in the following description repeat descriptions thereof are omitted.

At operation S750, the initiator transmits a second ping. The second ping may be configured to be detected by second-order and/or third-order adjacent neighboring MLPEs (e.g., 102-1 through 102-4 and/or 101-3 112-3 of FIG. 2). For example, in at least some example embodiments, an intensity (or signal strength) of the second ping may be set higher than the first ping and/or the responders may be configured to respond after receiving two pings a second-order threshold (e.g., between the first-order threshold and a minimum threshold, lower the threshold to respond) after operation S740, and/or the like.

At operation S760, the initiator receives the response to the second ping from the second-order and/or third-order adjacent neighboring MLPEs, and at operation S770, the initiator establishes a connection with the responding second-order and/or third-order adjacent neighboring MLPEs that did not respond to the first ping.

At operation S780, the initiator determines a ToA for the second-order and/or third-order adjacent neighboring MLPEs that did not respond to the first ping. For example, in at least one example, the initiator transmits a poll (or handshake) and receives a response from the second-order and/or third-order adjacent neighboring MLPEs that did not respond to the first ping. The response may include a time-to-reply indicator ($T_{reply}$ of FIG. 5), which indicates the period of time the responder took to reply to a received poll. In at least some example embodiments, the ToA may be determined to be half the difference between the time between the initiator transmitting the poll and receiving the response ($T_{loop}$) and the time to response ($T_{reply}$). Additionally, in at least some example embodiments, the initiator may receive the response twice. For example, in cases wherein the initiator includes two or more antennas, the initiator may receive the response at a first antenna and a second antenna. The initiator may determine the AoA based on a difference between the ToA for the first antenna and the ToA for the second antenna. In these cases, the adjacency list may further include the ToA for the two or more antennas and/or the corresponding AoA for each of the listed MLPE.

At operation S790, the MLPE generates the adjacency list such that the adjacency list includes the distance data for the MLPEs that responded to the first ping and the second-order and/or third-order adjacent neighboring MLPEs that did not respond to the first ping.

Though an example was described above, with relation to FIG. 7, the example embodiments are not limited thereto. For example, in at least one example embodiment, operation S740 may be integrated into operations S710 and/or S720, and/or operation S780 may be integrated into operations S750 and S760 such that the initiator establishes the ToA based on the ping and response. For example, in at least some example embodiments, the ping of operation S410 may include the poll and the response of S420 may include the time-to-reply indicator ($T_{reply}$ of FIG. 5). In some of these example embodiments, the operation S770 may also be omitted.

As described above, an array of PV generators including a plurality of self-reporting MLPEs, enables the array to self-monitor the array, thereby reducing installation, maintenance, and asset-tracking time and costs.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the preceding description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures, and techniques may be shown without unnecessary detail in order to avoid obscuring example embodiments.

As discussed herein, illustrative example embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing switches, hubs, routers, or other network elements, equipment and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently, or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Benefits, other advantages, and solutions to problems have been described above with regard to specific example embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A photovoltaic (PV) generator comprising:
    at least one PV module including a plurality of PV cells;
    a wireless communication interface;
    a powerline coupling configured to connect to a power line; and
    a module level power electronic (MLPE), the MLPE including processing circuitry and memory storing computer readable instructions that, when executed by the processing circuitry, cause the MLPE to
        determine times of arrival (ToAs) between the MLPE and neighboring MLPEs included in neighboring PV generators,
        generate an adjacency list, the adjacency list including a list of the neighboring MLPEs and data corresponding to the ToAs for each of the listed neighboring MLPEs, and
        transmit the adjacency list to a gateway computer, enabling the gateway computer to generate a network map based on the adjacency list,
    wherein the wireless communication interface comprises at least a first antenna and a second antenna, and
    the MLPE is further caused to determine the ToAs between the MLPE and the neighboring MLPEs by determining, for each of the neighboring MLPEs, a first ToA corresponding to the first antenna, and a second ToA corresponding to the second antenna and to determine an angle of arrival (AoA) for each of the neighboring MLPEs based on a time difference between the first ToA and the second ToA.

2. The PV generator of claim 1, wherein the MLPE is further caused to determine the ToAs by:
   transmitting a first ping configured to be detected by first-order adjacent MLPEs from among the neighboring MLPEs, and
   determining ToAs between the MLPE and the neighboring MLPEs that respond to the first ping.

3. The PV generator of claim 2, wherein the MLPE is further caused to determine the ToAs by:
   transmitting a second ping, the second ping configured to be detected by at least a portion of second-order adjacent MLPEs from among the neighboring MLPEs, and
   determining ToAs between the MLPE and the neighboring MLPEs that respond to the second ping and that did not respond to the first ping.

4. The PV generator of claim 1, wherein the MLPE is further caused to
   determine distances between the MLPE and each of the listed neighboring MLPEs based on the ToAs, and
   the data corresponding to the ToAs includes the determined distances.

5. The PV generator of claim 1, wherein the adjacency list includes attenuation data corresponding to an attenuation value of a powerline communication (PLC) between the PV generator and at least one of the neighboring PV generators.

6. The PV generator of claim 1, wherein the MLPE is further caused to initiate the determine the ToAs in response to at least one of:
   an initiation signal from the gateway computer,
   a determination that the PV generator is in an installation mode,
   a determination that a change in power generated by the PV generator is greater than a first threshold value,
   a determination that a change in power received from at least one of the neighboring PV generators is greater than a second threshold value, or
   any combinations thereof.

7. A network of photovoltaic (PV) generators comprising:
   an array of the PV generators; and
   a gateway computer,
   wherein, each of the PV generators includes
      a PV module,
      a wireless communication interface,
      a powerline coupling connected to a power line, and
      a module level power electronic (MLPE), the MLPE including processing circuitry and memory storing computer readable instructions that, when executed by the processing circuitry, cause the MLPE to
         determine times of arrival (ToAs) between the MLPE and neighboring MLPEs included in neighboring PV generators,
         generate an adjacency list, the adjacency list including a list of the neighboring MLPEs and data corresponding to the ToAs for each of the listed neighboring MLPEs, and
         transmit the adjacency list to the gateway computer, and
   wherein the gateway computer is configured to receive the adjacency list and to generate a network map based on the adjacency list,
   wherein the wireless communication interface comprises at least a first antenna and a second antenna, and
   the MLPE is further caused to determine the ToAs between the MLPE and the neighboring MLPEs by determining, for each of the neighboring MLPEs, a first ToA corresponding to the first antenna, and a second ToA corresponding to the second antenna and to determine an angle of arrival (AoA) for each of the neighboring MLPEs based on a time difference between the first ToA and the second ToA.

8. The network of claim 7, wherein the array of the PV generators includes, at least:
   a first string of PV generators connected in series, and
   a second string of PV generators connected in series, and
   wherein the first string and the second string are connected in parallel.

9. The network of claim 8, wherein the MLPE is further caused to determine attenuation values for powerline communications (PLC) between the PV generators connected in series, and
   the adjacency list includes data corresponding to the determined attenuation value.

10. The network of claim 7, wherein each of the PV generators is configured to establish a wireless connection with at least one of the neighboring PV generators.

11. The network of claim 10, wherein each of the PV generators is configured to transmit a health report through the wireless connection.

12. The network of claim 10, wherein the wireless connection includes at least one of a Bluetooth connection, a Wireless Fidelity (WiFi) connection, a wireless mesh network connection, a cellular network connection, or an ultra-wide band (UWB) connection.

13. The network of claim 7, wherein the MLPE is further caused to update the adjacency list in response to at least one of:
   an initiation signal from the gateway computer,
   a determination that a change in power generated by at least one of the PV generators is greater than a first threshold value,
   a determination that a change in power received from at least one of the neighboring PV generators is greater than a second threshold value, or
   any combinations thereof.

14. The network of claim 13, wherein the update the adjacency list includes redetermining the ToAs between the MLPE and the neighboring MLPEs.

15. The network of claim 13, wherein the gateway computer is further configured to:
   initiate the update in response to a change in power generated by at least one of the PV generators, and
   automatically transmit a notification indicating a potential abnormality in response to a difference between the network map and an updated network map generated using the updated adjacency list being greater than a tolerance value.

16. The network of claim 7, wherein the network map represents distances and directions between the neighboring MLPEs.

17. The network of claim 7, wherein
   the array of the PV generators is configured to establish a wireless communication network configured to communicate with a user's device, and
   the gateway computer is configured to determine a relative position of the user's device to at least one of the MLPEs included in the network map.

18. A gateway computer comprising:
processing circuitry; and
memory storing computer readable instructions that, when executed by the processing circuitry, cause the gateway computer to
  receive a plurality of adjacency lists from a plurality of photovoltaic (PV) generators, each of the adjacency lists including a list of neighboring PV generators detected by a respective PV generator and data corresponding to Time of Arrivals (ToAs) for each of the listed neighboring PV generators detected by the respective PV generator, and
  generate a network map based on the plurality of adjacency lists, the network map indicating distances and directions between each of the plurality of PV generators,
wherein the respective PV generator comprises a wireless communication interface comprising at least a first antenna and a second antenna, and
the respective PV generator is further caused to determine the ToAs, for each of the listed neighboring PV generators, a first ToA corresponding to the first antenna, and a second ToA corresponding to the second antenna and to determine an angle of arrival (AoA) for each of the listed neighboring PV generators based on a time difference between the first ToA and the second ToA.

19. The gateway computer of claim 18, wherein the gateway computer is further caused to generate the network map by:
  selecting a first adjacency list of the plurality of adjacency lists, the first adjacency list corresponding to a first PV generator of the plurality of PV generators;
  generating the network map based on the selected first adjacency list by assigning each of the listed neighboring PV generators included in the first adjacency list a corresponding orientation relative to the first PV generator;
  selecting a second adjacency list of the plurality of adjacency lists, the second adjacency list corresponding to a second PV generator of the listed neighboring PV generators;
  growing the network map based on the second adjacency list by assigning each of the listed neighboring PV generators included in the second adjacency list a corresponding orientation relative to the second PV generator;
  determining where there is a mismatch in the orientations; and
  validating the growing network map based on a determination that there is no mismatch between the orientations.

* * * * *